United States Patent
Williams et al.

(10) Patent No.: US 6,753,842 B1
(45) Date of Patent: Jun. 22, 2004

(54) SYSTEM AND METHOD FOR BACKLIGHTING CONTROL IN A WIRELESS COMMUNICATION DEVICE

(75) Inventors: Martin J. Williams, San Diego, CA (US); James J. Willkie, Poway, CA (US); Mazen Chmaytelli, San Diego, CA (US); Bilhan Kirbas, La Jolla, CA (US); Samir K. Khazaka, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 09/468,003

(22) Filed: Dec. 20, 1999

(51) Int. Cl.[7] ............................................. G09G 3/36
(52) U.S. Cl. .................. 345/102; 348/602; 340/359.13
(58) Field of Search ........................... 345/102, 63, 77; 348/227, 602; 340/426.19, 539.13, 426.2, 426.21, 426.22

(56) References Cited

U.S. PATENT DOCUMENTS

| | | | | |
|---|---|---|---|---|
| 5,406,305 A | * | 4/1995 | Shimomura et al. | ........ 345/102 |
| 5,684,294 A | * | 11/1997 | Kouhi | .................. 250/214 AL |
| 5,898,384 A | * | 4/1999 | Alt et al. | ............... 340/825.36 |
| 5,933,089 A | | 8/1999 | Katada | ....................... 340/825 |
| 6,208,861 B1 | * | 3/2001 | Suzuki | ........................ 455/441 |
| 6,339,429 B1 | * | 1/2002 | Schug | ........................ 345/589 |

FOREIGN PATENT DOCUMENTS

| | | | |
|---|---|---|---|
| GB | 2320851 | * | 7/1998 |
| GB | 2327315 | * | 1/1999 |

* cited by examiner

Primary Examiner—Bipin Shalwala
Assistant Examiner—Ricardo Osorio
(74) Attorney, Agent, or Firm—Philip Wadsworth; Charles D. Brown; Howard H. Seo

(57) ABSTRACT

A wireless communication device (100) includes a display (120) having a backlight (124). A backlight controller (126) selectively enables the backlight (124) to minimize power consumption and conserve energy in a battery (132). In one embodiment, a receiver (110) receives a time-of-day message from a remote location to set a timer (122) with the current time-of-day. The current time-of-day is compared with a predetermined time-of-day and the backlight controller (126) enables and disables the backlight (124) at predetermined times-of-day. The wireless communication device (100) may also include a GPS receiver (128), to determine the location of the device. The backlight controller (126) can determine the sunrise or sunset times for the specific location. The GPS data may be used in combination with the time-of-day message. A photosensor (130) can detect ambient light levels and generate an electrical signal corresponding thereto. The backlight controller (126) may use the photosensor (130) to determine ambient light levels and to enable or disable the backlight (124) based only on ambient light levels. The photosensor signal can be used in combination with the time-of-day message and/or the location data from the GPS receiver (128) to control the backlight (124).

17 Claims, 4 Drawing Sheets

SYSTEM AND METHOD FOR BACKLIGHTING CONTROL IN A WIRELESS COMMUNICATION DEVICE

FIELD OF THE INVENTION

The present invention is directed generally to a wireless communication device, and, more particularly, to a system and method for controlling backlighting in a wireless communication device.

BACKGROUND OF THE INVENTION

Wireless communication devices, such as cellular telephones, typically include a keypad and a display. The display may include several lines of alphanumeric characters that provide the user with instructions for operation of the device, feedback in response to user activation of selected buttons on the keypad, and other data display, such as data related to an incoming call.

A common display type uses a liquid crystal display (LCD) because of its low-cost, readability, and low power consumption. A disadvantage of an LCD is that it has poor readability with low ambient light levels. The typical LCD includes a backlight to light the display and thereby enhance readability. The backlight, which is typically an incandescent light, consumes far more electrical power than the LCD itself.

The typical wireless communication device is battery-powered. Conservation of battery power is important to increase the operating duration of the device. Activating the backlight for the LCD display consumes a significant amount of battery power and therefore decreases the operating time of the device. Therefore, it can be appreciated that there is a significant need for wireless communication device that provides backlighting for enhanced readability and conserves battery power. The present invention provides this and other advantages as will be apparent from the following detailed description and accompanying figures.

SUMMARY OF THE INVENTION

The present invention is embodied in a system and method for controlling a display light in a wireless communication device. In one embodiment, the system includes a receiver that receives communication signals from a location remote from the receiver. The system also includes a display and a display light that may be selectively enabled by an enable signal. A light controller generates the enable signal based at least in part on signals received by the receiver.

In one embodiment, the receiver receives a time-of-day signal from the remote location and the light controller generates the enable signal based on the time of day. The system may further include a photosensor element to sense ambient light and to generate a signal related to the level of ambient light. In this embodiment, the light controller generates the enable signal based on the time of day and on the level of ambient light. The light controller may generate the enable signal based on the time of day for a first predetermined portion of the day and based on the level of ambient light for the remaining portion of the day.

In another embodiment, the receiver receives positioning signals from the remote location and the light controller generates the enable signals based on the location of the receiver. This embodiment may also include a photosensor element such that the light controller generates the enable signal based on the location of the receiver and on the ambient light.

In yet another alternative embodiment, the light controller may generate the enable signal based solely on the ambient level of light and the signal generated by the photosensor element. If the ambient level of light drops below a predetermined threshold, the light controller may generate the enable signal and ceases generation of the enable signal if the ambient light level is above a second predetermined threshold.

DETAILED DESCRIPTION OF THE PREFERRED EMBODIMENTS

The present invention provides intelligent control of backlighting and, as a result, reduces battery drain. The present invention may be readily implemented in any wireless communication device. Although the examples pressured herein refer to a cellular telephone, the principles of the present invention are applicable to any wireless communication device, including, but not limited to, analog and digital cellular telephones, personal communications system (PCS) devices, and the like. The present invention is embodied in a system 100 illustrated in the functional block diagram of FIG. 1. The system 100 includes a central processing unit (CPU) 102, which controls operation of the system. A memory 104, which may include both read-only memory (ROM) and random access memories (RAM), provides instructions and data to the CPU 102. A portion of the memory 104 they also include non-volatile random access memory.

Figure 1:
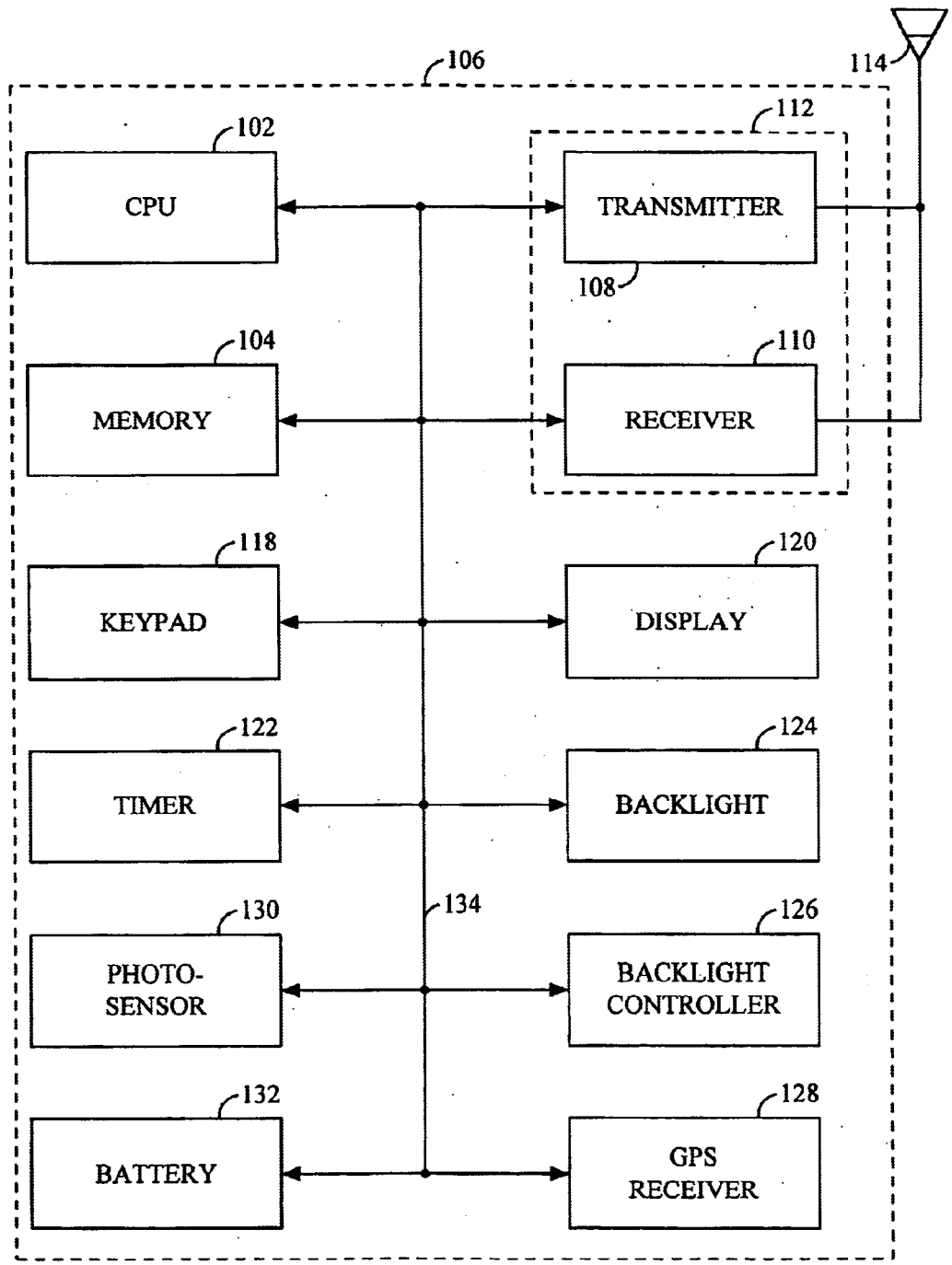
FIG. 1 is a functional block diagram of a wireless communication device implementing the present invention.

The system 100, which is typically embodied in a wireless communication device such as cellular telephone, also includes a housing 106 that contains a transmitter 108 and a receiver 110 to allow transmission and reception of data, such as audio communications, between the system 100 and a remote location, such as a cell site controller (not shown). The transmitter 108 in the receiver 110 may be combined into a transceiver 112. An antenna 114 is attached to the housing 106 and electrically coupled to the transceiver 112. The operation of the transmitter 108, receiver 110, and antenna 114 is well-known in the art in need not be described herein. Although FIG. 1 illustrates the antenna 114 is extending from the housing 106, some designs may include an internal antenna that is contained completely within the housing. However, the transmitter 108, receiver 110, and antenna 114 operate in a conventional manner regardless of the location of the antenna.

A keypad 118 is attached to the housing 106 for operation by the user in a conventional manner. The keypad 118 provides a convenient input device by which destination telephone numbers and commands may be entered by the user.

The system 100 also includes a display 120 that may be conveniently used to display instructions to the user as well as user-entered data, such as destination telephone numbers and alphanumeric text. In an exemplary embodiment of the system 100, the display 120 will display the time and date and calling party telephone number for incoming calls received by the transceiver 112. This information provides visual cues to the user and thereby assists the user in the operation of the system 100.

The system 100 also includes a timer 122, which may typically be included in the CPU 102. As will be discussed in greater detail below, system 100 may use the timer 122 to determine the time and date. In addition, the timer 122 may be used to light a backlight 124 for a predetermined period of time. The system 100 includes a backlight controller 126 to control the backlight 124 for the display 120. As will be described in greater detail below, various alternative embodiments of the backlight controller 126 may be used control the backlight 124 and thereby reduce power consumption in the system 100. In addition, different display types may use a different form of lighting, such as side-lighting of a liquid crystal display (LCD) or a light-emitting diode (LED) display. The term "backlight" is intended to encompass any form of display illumination whether it is the display itself or an external illumination source.

In one embodiment, the system 100 includes a global positioning system (GPS) receiver 128. As is known in the art, GPS comprises a plurality of satellites orbiting the Earth. A GPS receiver, such as the GPS receiver 128, receives signals from some of the plurality of the orbiting satellites. Based on the received signals, it is possible to determine the precise location of the GPS receiver 128 with a high degree of accuracy. Portable GPS receivers are known in the art, and need not be described in greater detail herein. If the system 100 includes the GPS receiver 128, the position of the system may be used by the backlight controller 126 to enable the backlight 124. The use of the GPS receiver 128 in the backlight controller 126 will be described in greater detail below.

In one embodiment, the system 100 includes a photosensor 130, which detects ambient light levels and generates electrical signals related thereto. As will be described in greater detail below, the backlight controller 126 receives the electrical signals from the photosensor 130 and may selectively activate the backlight 124 when the ambient light falls below a predetermined level.

Electrical components of the system 100 receive power from a battery 132, which is attached to and supported by the housing 106. In exemplary embodiment, the battery 132 is a rechargeable battery. In other embodiments, the system 100 may include a connector (not shown) for the connection of an external power source, such as an automobile power adapter, AC power adapter, or the like.

The various components of the system 100 are coupled together by a bus system 134, which may include a power bus, control bus, and status signal bus in addition to a data bus. However, for the sake of clarity, the various buses are illustrated in FIG. 1 as the bus system 134.

The backlight controller 126 may be implemented in a variety of ways. In one embodiment, illustrated in FIG. 2, the timer 122 receives a time-of-day message from a base transceiver station (BTS) 150 via a cell site controller (not shown). The time-of-day message is used to set the timer 122 or a clock whose time is shown on the display 120. The techniques used to transmit the time-of-day message to the system 100 are well-known in the art and the need not be described in greater detail herein.

The backlight controller 126 uses the time-of-day to selectively enable or disable the backlight 124 during predetermined times of day. For example, the backlight controller 126 may be programmed to enable the backlight 124 between the hours of 7 p.m. and 7 a.m. During this predetermined period of time, the backlight controller 126 will selectively enable the backlight 124 whenever a button on the keypad 118 is activated by the user. In addition, the system 100 may enable the backlight 124 when receiving an incoming telephone call. Outside the predetermined hours (e.g., between the hours of 7 a.m. and 7 p.m.), the backlight controller 126 will not enable the backlight 124 even when a button on the keypad 118 is activated by the user or when incoming message is received by the system 100. Those skilled in the art will appreciate that the hours of activation used above are illustrative only and that the present invention is not limited by specific hours of operation of the backlight 124. The user can program the hours of activation using the keypad 118 and display 120 in the same manner used to select other operational parameters of a typical cellular telephone.

One advantage of implementing the system 100 with the time-of-day message is that most wireless communication devices (e.g., cellular and PCS devices) are already configured to receive the time-of-day message. The backlight controller 126 may be readily implemented as a series of software instructions placed in the memory 104 and executed by the CPU 102. Thus, minor software modifications to existing hardware will allow the implementation of the system 100 using the time-of-day message.

Figure 2:
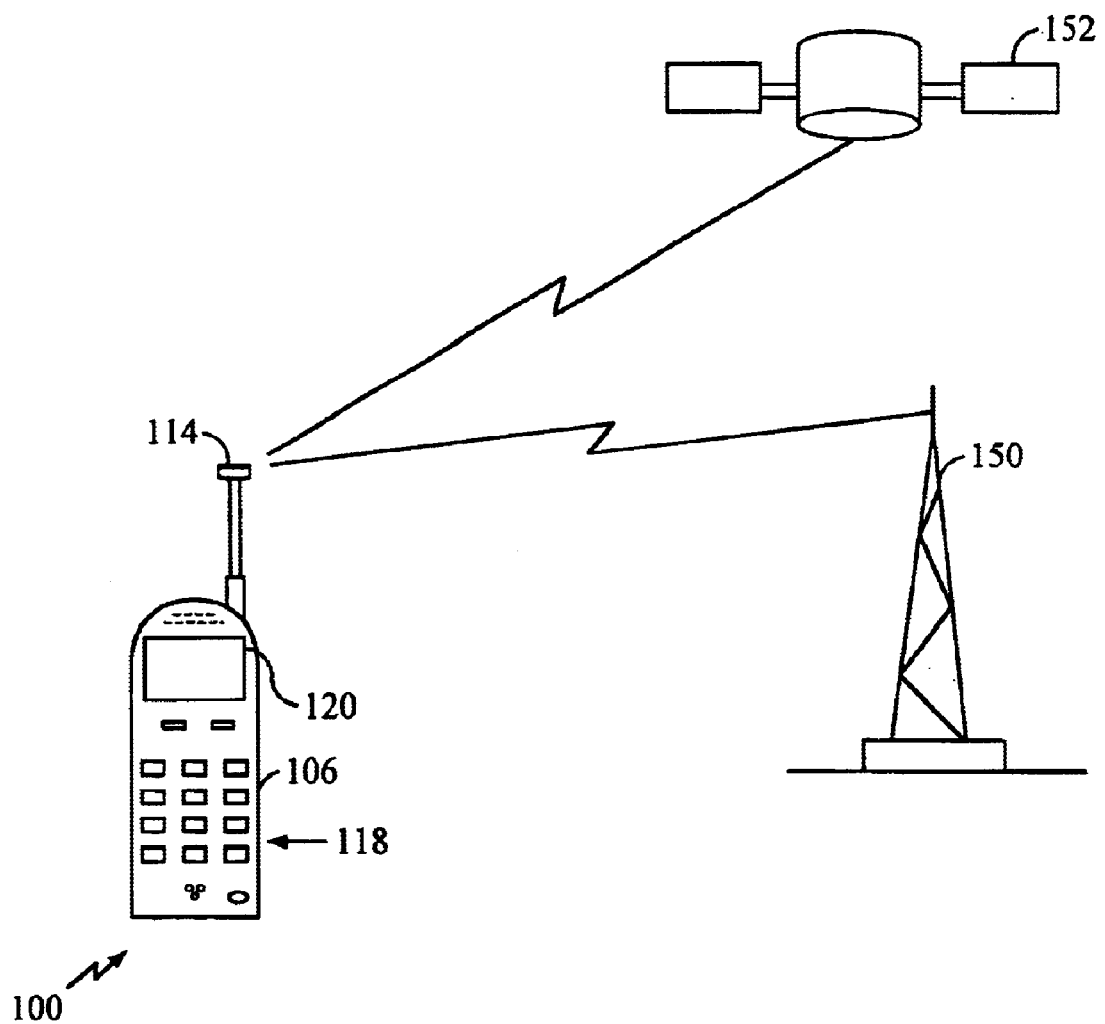
FIG. 2 illustrates the operation of the system of FIG. 1 using data received from external sources.

The backlight controller 126 may also use location information to enable the backlight 124. As previously described, the system 100 may include GPS receiver 128, which operates in a known manner to receive signals from a plurality of GPS satellites, one of which is illustrated in FIG. 2 as a GPS satellites 152. For the sake of clarity, other GPS satellites are not illustrated in FIG. 2. Given the precise location of the system 100, the backlight controller 126 can determine the precise time of sunset at that location. The backlight controller 126 selectively enables the backlight 124 at sunset for the location of the system 100 and selectively disables the backlight 124 at sunrise for the location of the system.

Those skilled in the art will appreciate that ambient light levels may be insufficient for satisfactory operation of the system 100 before sunset or after sunrise. Accordingly, the backlight controller 126 can selectively enable the backlight 124 a predetermined period of time before sunset and selectively disable the backlight 124 it predetermined period of time after sunrise to allow for satisfactory operation in low ambient light. The present invention is not limited by the specific time-of-day at which the backlight 124 is selectively enabled or disabled.

The GPS receiver 128 may be used in combination with the time-of-day message transmitted by the BTS 150. In this embodiment, the backlight controller 126 uses the time-of-day message to determine the local time and uses the location data from the GPS receiver 128 to determine the precise location of the system 100 and thereby determine the time of sunrise and sunset at that precise location. If the wireless communication device already includes the GPS receiver 128, the backlight controller 126 may be readily implemented as a series of software instructions that utilize that location data generated by the GPS receiver alone or in combination with time-of-day message.

One drawback of these embodiments is that it presumes that ambient light is always available during daytime hours and is never available during the nighttime hours. However, it is possible that the user could enter a darkened room during daylight hours. In this circumstance, the backlight controller 126 may not operate satisfactorily since the backlight 124 is selectively disabled during daylight hours. Similarly, the backlight controller 126 may selectively enable the backlight 124 during nighttime hours even when the user is a lighted room. Although this latter example does not affect the user's ability to operate the system 100, it does not provide the desired reduction in power consumption and reduces the life of the battery 132 (see FIG. 1) between charging cycles. The system 100 can provide an override command to allow the user to manually enable or disable the backlight 124. The use of the keypad 118 to set the operational parameters of the system 100 is well-known in the art and need not be described herein.

The system 100 may also use the photosensor 130 alone or in combination with time-of-day message from the BTS 150 and/or the location data from the GPS receiver 128. If the photosensor 130 is used alone, the backlight controller 126 receives the electrical signals generated by the photosensor that indicate the ambient light level. If the ambient light level falls below a predetermined threshold, the backlight controller 126 selectively enables the backlight 124. As those skilled in the art will appreciate, actual activation of the backlight 124 occurs when the keypad 118 is activated by the user or when an incoming message is received. If the ambient light level is above a predetermined threshold, the backlight controller 126 will selectively disable the backlight 124.

When used in combination with the time-of-day message, the electrical signals generated by the photosensor 130 are used to effectively override the normal setting provide by the time-of-day message. For example, backlight controller 126 may selectively disable the backlight 124 based on the time-of-day message (e.g., during daylight hours). However, if user enters a darkened room or is in some other low ambient light setting, the electrical signals generated by the photosensor 130 indicate that the ambient light level is below a predetermined threshold. In that event, the backlight controller 126 overrides the setting based on the time-of-day message and selectively enables the backlight 124 to automatically provide backlighting when necessary.

Similarly, the backlight controller may selectively enabled the backlight 124 based on the time-of-day message (e.g., during nighttime hours). However, if the user enters a lighted room or is in some other high ambient light setting, the electrical signals generated by the photosensor 130 indicate that the ambient light level is above a predetermined threshold. In that event, the backlight controller 126 overrides the setting based on the time-of-day message and selectively disables the backlight 124 thus conserving power and extending the life of the battery 132 between charging cycles.

The photosensor 130 may also operate in conjunction with the GPS receiver 128 in a similar manner to override the normal setting based on the location data generated by the GPS receiver. That is, the backlight controller 126 may use the electrical signals generated by the photosensor 130 to selectively enable or disable the backlight 124 regardless of the setting based on the location data generated by the GPS receiver 128.

Figure 3:
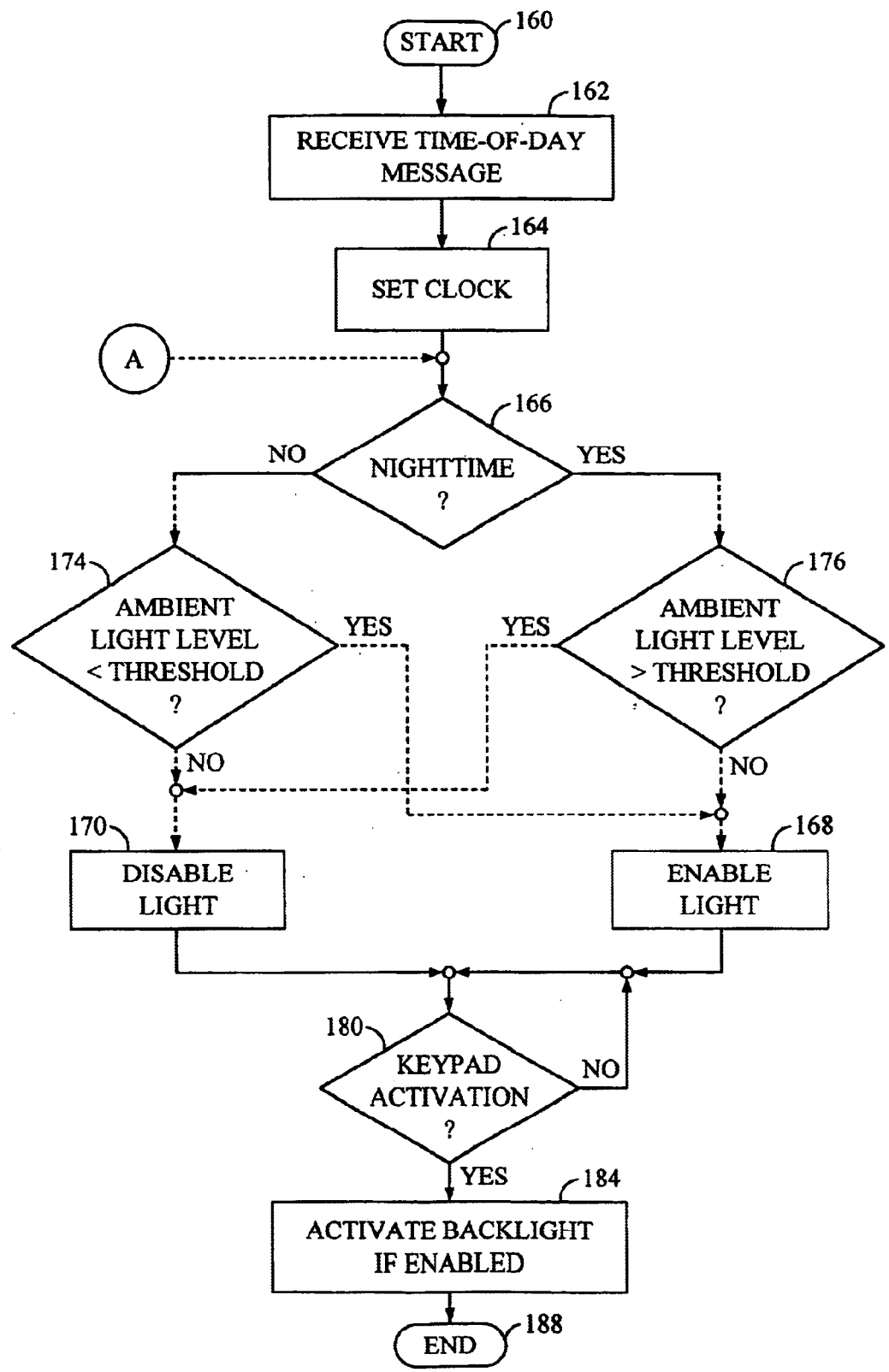
FIG. 3 is a flowchart illustrating the operation of the system of FIG. 1 to selectively enabling backlight based on the time-of-day.

The operation of the system 100 with the time-of-day message is illustrated in the flowchart of FIG. 3. At a start 160, the wireless communication device is under power. In step 162, the system 100 receives a time-of-day message from the BTS 150 (see FIG. 2). In step 164, the system 100 sets its internal clock. It should be noted that the timer 122 (see FIG. 1) also serves the function of the internal clock. Those skilled in the art will appreciate that the timer 122 may be contained within the CPU 102. The present invention is not limited by the specific form of the timer 122.

In decision 166, the system 100 determines whether it is nighttime. The specific times at which the backlight 124 is selectively enabled and disabled can be preprogrammed into the system 100 or selected by the user. For example, the system 100 can have default times, such as at 7 p.m. and 7 a.m., to selectively enable and disable the backlight 124. Alternatively, the user may alter the default times through the selection of the appropriate menu on the display 120 with the keypad 118 using conventional techniques. For example, if the user lives in higher latitudes, where summertime days are long and a wintertime days are short, the user can manually adjust the default times to compensate for seasonal variations in the length of days.

The actual time of day is compared with predetermined hours of backlight operation (i.e., either the default times or the user-programmed times). Decision 166 compares the present time with the predetermined times to determine whether or not to enable the backlight 124. If it is nighttime (e.g., between 7 p.m. and 7 a.m., the result of decision 166 is YES. In that event, the backlight controller 126 selectively enables the backlight 124 in step 168. If it is not nighttime, the result of decision 166 is NO. In that event, the backlight controller 126 selectively disables the backlight 124 in step 170.

As previously discussed, the photosensor 130 (see FIG. 1) can be used to override the setting based on the time-of-day. Decisions 174 and 176 are optional steps that can be incorporated into the system 100 if the photosensor 130 is included. In FIG. 3, the ambient light level is compared with a threshold value in decision 174. If the ambient light level is below the threshold, the result of decision 174 is YES and the system 100 moves to step 168 to enable the backlight 124 despite the fact that it is not yet nighttime (i.e., the result of decision 166 was NO).

Similarly, in decision 176, the system 100 determines whether the ambient light level is above a predetermined threshold. For the sake of convenience, the ambient light level thresholds used in the decision 174 and 176 may be the same light threshold. However, this is not required for satisfactory operation of the system 100. That is, the system 100 may use a first threshold in decision 174 and a second threshold, different from the first threshold, in decision 176. If the ambient light level is above the predetermined threshold, the result of decision 176 is YES. In that event, the system 100 moves to step 170 to disable the backlight 124 despite the fact that it is nighttime (i.e., the result of decision 166 was YES).

In decision 180, the system 100 determines whether it the user has activated keypad 118 (see FIG. 1). If the user has activated the keypad 118, the result of decision 180 is YES. In that event, in step 184 the backlight controller 126 activates the backlight 124 if the backlight has been enabled and does nothing in step 184 if the backlight is disabled. The system ends the operation at step 188. If no activation of the keypad occurs, the result of decision 180 is NO. In that event, the system 100 returns to decision 180 to await subsequent activation of the keypad 118. For purposes of understanding the present invention, the system 100 is illustrated in the flowchart of FIG. 3 as sitting in a loop at decision 180 awaiting activation of the keypad 118. However, those skilled in the art will recognize that keypad activation may generate an interrupt that is processed by the CPU 102. Thus, in a typical implementation, the system 100 does not sit in an endless loop awaiting activation of the keypad 118. In addition, the backlight 124 may be activated in step 184 if the receiver 110 (see FIG. 1) receives an incoming call. Other events, such as voicemail notification and the like can also trigger activation of the backlight 124 if it has been selectively enabled. Thus, keypad activation is not the only event that can trigger activation of the backlight 124.

Figure 4:
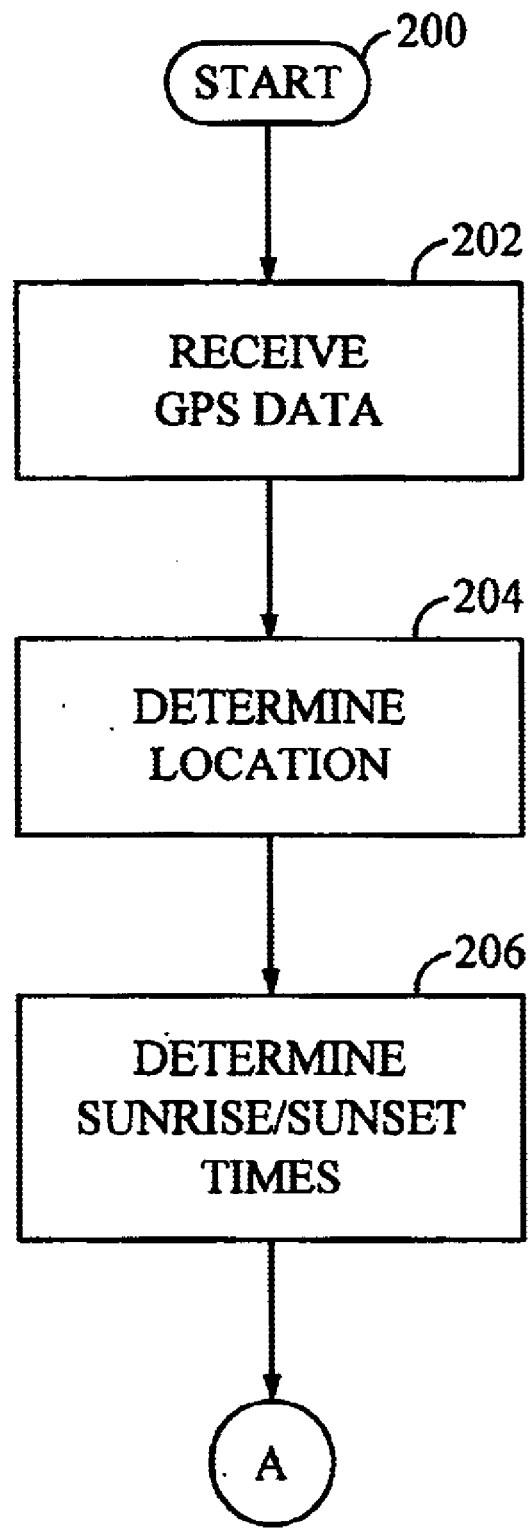
FIG. 4 is a flowchart illustrating the operation of the system of FIG. 1 to selectively enabling backlight based on the geographic location of the system.

The operation of the system 100 with the GPS receiver 128 (see FIG. 1) is illustrated in the flowchart of FIG. 4. At a start 200, the system 100 is under power. At step 202, the GPS receiver 128 receives GPS data from a plurality of GPS satellites 152 (see FIG. 2) and determines the location of the system 100 in step 204. In step 206, the system 100 determines the sunrise and the sunset times for the location determined in step 204. The system 100 then moves to decision 166, illustrated in FIG. 3, to determine whether the present time-of-day corresponds with the sunrise and/or sunset times calculated in step 206. The remaining operations, including the use of ambient light levels to override the operation of step 168 to enable the backlight 124 or the operation of the step 170 to disable the backlight, have been described above and need not be described again at this point.

Thus, the system 100 advantageously provides an intelligent control of the backlight 124 and thereby conserves the electrical power. In several embodiments, the invention may be readily implemented through the addition of software instructions alone and require no hardware modifications. For wireless communication devices that include GPS capability, the invention may also be implemented with the addition of software instructions. It should be noted that other forms of positioning, such as triangulation, timing signals from a plurality of base station transceiver systems 150 (see FIG. 2) or other conventional positioning technology may be satisfactorily used with the system 100. One advantage of positioning data is that the lighting may be adjusted to compensate for variations in the length of day based on the location of the wireless communication device.

Is to be understood that even though various embodiments in advantages of the present invention have been set forth in the foregoing description, the above disclosure is illustrative only, and changes may be made in detail, yet remain within the broad principles of the invention. For example, the system 100 may be implemented using only the time-of-day message, the location data from the GPS receiver 128, or the electrical signals generated by the photosensor 130 to control operation of the backlight 124. However, these various techniques they be combined in various manners to meet different design criteria. Therefore, the present invention is to be limited only by the appended claims.

What is claimed is:

1. A system for the control of backlighting in a wireless communication device, the system comprising:
    a housing;
    a receiver to receive communication signals from a location remote from the receiver, the communication signals including a location signal indicating the location of the wireless communication device and a time-of-day signal indicating the local time;
    a display supported by the housing;
    a photosensor element to sense an ambient light level and to generate an ambient light signal based on the ambient light level;
    a display light to light the display, the display light being selectively enabled by an enable signal; and
    a light controller to generate the enable signal and determine daylight hours based on the location signal,
    wherein the light controller generates the enable signal based on the ambient light signal, the time-of-day signal and the daylight hours determined based on the location signal.

2. The system of claim 1, further comprising a timer to track time of day wherein the light controller generates the enable signal based on the time of day.

3. The system of claim 2 wherein the timer uses the time-of-day signal to track the time of day.

4. The system of claim 1 wherein the light controller activates the display light when the receiver receives an incoming message if the enable signal has been generated.

5. The system of claim 4, further comprising a keyboard operable by a user wherein the light controller activates the display light when the keyboard is operated by the user if the enable signal has been generated.

6. The system of claim 5, further comprising a timer to measure a predetermined time period when the keyboard is operated by the user wherein the light controller deactivates the display light if the keyboard is not operated by the user for the predetermined time period.

7. The system of claim 6 wherein the predetermined time period measured by the timer is user-selectable.

8. The system of claim 1 wherein the remote location is at least a first satellite and the location signal from the remote location comprises global positioning satellite signals.

9. A method for the control of backlighting in a wireless communication device, the method comprising:
    receiving signals for use in controlling display lighting, the received signals including a location signal indicating the location of the wireless communication device and a time-of-day signal indicating the local time;
    sensing an ambient light level and generating an ambient light signal based on the ambient light level;
    determining daylight hours based on the location signal;
    displaying data on a display; and
    selectively enabling a display light to light the display based on the ambient light signal, the time-of-day signal and the daylight hours determined based on the location signal.

10. The method of claim 9, further comprising measuring a time of day and selectively enabling the display light based on the time of day.

11. The method of claim 10 wherein the display light is selectively enabled signal based on the ambient light level if the generated signal related to the ambient light level indicates that the level of ambient light is below a predetermined threshold regardless of the time of day.

12. The method of claim 9, further comprising receiving an incoming message from a remote location and activating the display light upon receipt of the incoming message if the display light has been selectively enabled.

13. The method of claim 12 wherein the remote location is at least a first satellite and receiving the location signal from the remote location comprises receiving satellite signals.

14. The method of claim 9, further comprising sensing user operation of a keyboard and activating the display light when the keyboard is operated by the user if the display light has been selectively enabled.

15. The method of claim 14, further comprising measuring a predetermined time period when the keyboard is operated by the user and deactivating the display light if the keyboard is not operated by the user for the predetermined time period.

16. The method of claim 9, further comprising measuring a time of day and generating a signal related thereto, the received signals to control display lighting being the generated signal related to the time of day, the display light being selectively enabled based on the time of day.

17. A system for controlling a backlighting in a wireless communication device, the system comprising:

means for receiving signals for use in controlling display lighting, the received signals including a location signal indicating the location of the wireless communication device and a time-of-day signal indicating the local time;

means for sensing an ambient light level and generating an ambient light signal based on the ambient light level;

means for determining daylight hours based on the location signal;

means for displaying data on a display; and means for selectively enabling a display light to light the display based on the ambient light signal, the time-of-day signal and the daylight hours determined based on the location signal.

* * * * *